United States Patent
Evans et al.

(10) Patent No.: US 7,537,338 B2
(45) Date of Patent: May 26, 2009

(54) BIFOCAL CONTACT LENS

(76) Inventors: Simon Rodney Evans, Botany (AU);
Arthur Ho, Clovelly (AU); Geoffrey Peter Brent, Matraville (AU); Klaus Ehrmann, Manly (AU); Darrin Mark Falk, Glebe (AU); Sandya Indrani Perera, Randwick (AU); Jacqueline Tan, Leichhardt (AU); Renee Du Toit, New South Wales (AU)

( * ) Notice: Subject to any disclaimer, the term of this patent is extended or adjusted under 35 U.S.C. 154(b) by 286 days.

(21) Appl. No.: 10/588,088

(22) PCT Filed: Jan. 28, 2005

(86) PCT No.: PCT/AU2005/000101

§ 371 (c)(1),
(2), (4) Date: Jul. 27, 2006

(87) PCT Pub. No.: WO2005/073786

PCT Pub. Date: Aug. 11, 2005

(65) Prior Publication Data

US 2007/0132948 A1     Jun. 14, 2007

(30) Foreign Application Priority Data

Jan. 29, 2004  (AU)  ............................... 2004900398

(51) Int. Cl.
*G02C 7/04* (2006.01)

(52) U.S. Cl. ..................................................... 351/161
(58) Field of Classification Search ................... 351/161
See application file for complete search history.

(56) References Cited

U.S. PATENT DOCUMENTS

| 4,728,182 | A | * | 3/1988 | Kelman | 351/161 |
| 5,141,301 | A | * | 8/1992 | Morstad | 351/161 |
| 7,004,585 | B2 | * | 2/2006 | Lindacher | 351/161 |
| 2003/0016331 | A1 | * | 1/2003 | Mandell | 351/161 |

FOREIGN PATENT DOCUMENTS

WO  2004/072710 A2  8/2004

* cited by examiner

*Primary Examiner*—Jordan M. Schwartz
(74) *Attorney, Agent, or Firm*—Jian Zhou; Robert Ambrose

(57) ABSTRACT

A contact lens having near vision and distance vision portions, the lens being movable on the eye between first and second positions, those positions corresponding with aligning the wearer's vision through the near vision and distance vision portions respectively. The lens is positionally stable on the eye in each of the two positions, and requires a force to be applied to the lens to move between the first and second positions. Preferably the lens has a back surface and a front surface, and said back surface has either one or two major back curve zones occupying a major portion of the lens back surface.

12 Claims, 6 Drawing Sheets

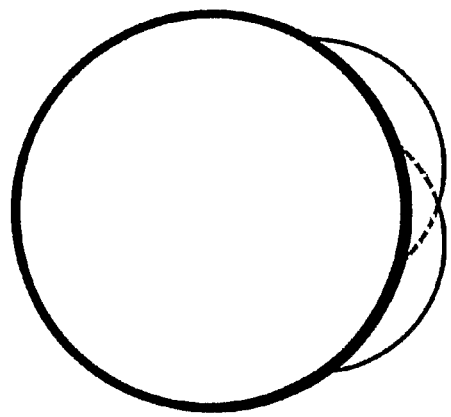
FIG. 6
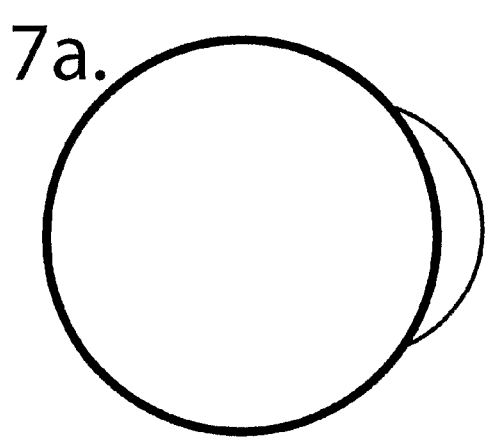 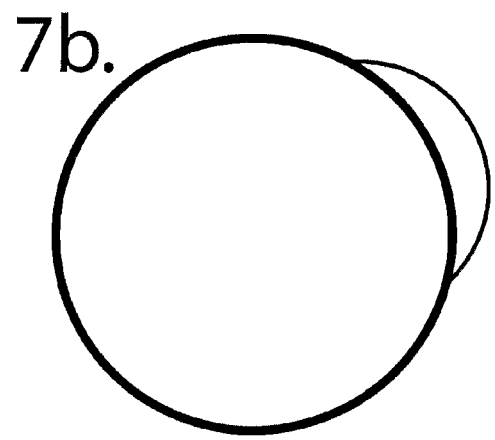
FIG. 7
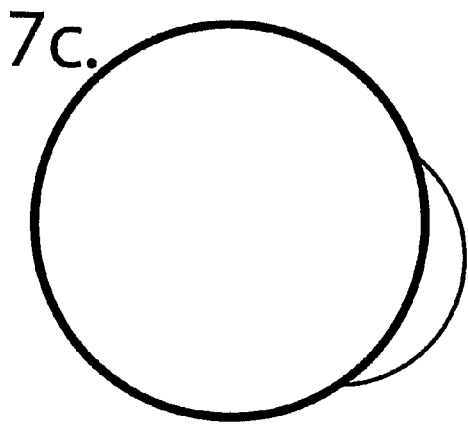

8a.

Cross-section      Front

8b.

Cross-section      Front

BIFOCAL CONTACT LENS

This application is a national stage filing under 35 U.S.C. 371 of PCT International Application No. PCT/AU05/000101 filed on Jan. 28, 2005, which claims benefits under 35 U.S.C. §119(a)-(d) or §365(b) of Australian Patent Application No. 2004900398 filed Jan. 29, 2004.

FIELD OF THE INVENTION

This invention relates to contact lenses, and more particularly to bifocal contact lenses in which at least one primary and one secondary optical zones are present.

BACKGROUND OF THE INVENTION

Bifocal lenses are comprised of two or more areas, or zones, with different optical powers, including typically a far-power zone for distance vision, and a near-power zone for near or close up vision. The two zones may be subdivided into additional power zones in which case the lens may be called a multifocal lens.

The retinal image and the visual percept that results from it are dependent upon the light that enters the eye through the entrance pupil. In order for a bifocal contact lens to function properly the entrance pupil must be covered at least partly or, more effectively, completely by the far-power zone of the lens when the eye observes a distant object and covered at least partly or, more effectively, completely by the near-power zone of the lens when the eye observes a near object. This function can be accomplished by the principle of alternating vision in which a shifting action (typically vertical) or translation of the contact lens is made to occur in order to place one or the other zone in front of the entrance pupil as the eye alternates between viewing distance and near objects.

An alternative principle, known as simultaneous vision can be utilized whereby the lens is designed and fitted in such a way as to position part or all of both the far and near-power zones in front of the entrance pupil at the same time so that each contributes to the retinal image simultaneously. This type of lens requires no translation, but has the drawback that two images are viewed simultaneously. The present invention is not concerned with nontranslating lenses, although translation might be combined with simultaneous vision.

In rigid prism bifocal contact lenses the lower edge of the lens tends to rest on the upper margin of the lower lid. When the wearer views a distant object the far-power zone ideally is positioned to cover the entrance pupil of the eye, and the near-power zone is positioned below the entrance pupil. The lens is held in position by gravity and the downward force of the upper lid. For near vision tasks, the eye rotates downward and the contact lens ideally shifts upward relative to the eye, moving the near-power zone to a position in front of at least part of the entrance pupil in order to provide an optical correction for near vision.

Attempts have been made to design soft contact lenses which operate in a similar manner to that described above with hard lenses. However, soft bifocal contact lenses tend to be much larger than rigid contact lenses, usually between 13 and 15 mm in diameter, and often extend beyond the limbus of the eye. When a soft prism bifocal contact lens is worn, the thicker portion of the lens moves downward and lies beneath the lower lid. As a result, the lens is not supported or braced by the upper margin of the lower lid. Hence, the prism component is successful in moving a soft prism bifocal contact lens to the desired low position and controlling meridional rotation but is not successful in inducing vertical lens shifts as the eye looks back and forth between distant and near objects.

Presently available soft bifocal contact lenses do not have sufficient vertical shifting action to fulfil the alternating vision principle and thus do not provide acceptable vision for both distance and near viewing. Most soft bifocal contact lenses that are available today are of the concentric bifocal type, and operate on the principle of simultaneous vision. It is recognized that theses lenses do not provide good vision for both distance and near viewing and are only worn successfully by those who are willing to accept less than optimal vision.

Devices are known to induce a vertical shift in a soft bifocal lens. U.S. Pat. No. 6,109,749 describes a soft bifocal contact lens that has an integrally formed bevel to aid translation of the lens. The bevel portion has upper and lower shoulders which converge to form an extended bevel. The bevel does not form part of the optical portion of the lens. U.S. Pat. No. 5,635,998 shows a multifocal contact lens that has an ellipsoidal shape and a single prism, which in combination produce an elongated zone of contact between the base portion of the prism and the lower eyelid. U.S. Pat. No. 5,912,719 shows a lens that is comprised of palpebral (lid) bosses projecting locally from the external surface in the peripheral circumferential direction and with a crest line of limited dimensions. The crest line has a peak in its middle area.

U.S. Patent Application 20030016331 discloses a soft bifocal contact lens incorporating two or more prisms into the same lens, which operate together but with different structure and function. One of the primary prisms provides a desired lens vertical positioning on the eye during distance viewing and control of meridional rotation in the plane of the corneal perimeter, the limbus. In addition, a secondary prism has a base that extends forward from the adjacent lens surface and provides for vertical lens shifting, or translation, so that the desired optical power zone of the contact lens is moved in front of the entrance pupil of the eye at the desired time. Typically the lens contains a segmented bifocal area on one surface in which the far-power zone of the lens is uppermost and the near-power zone lowermost in position.

Accordingly, devices are known for use with both soft and hard bifocal contact lenses for translating the lens automatically to provide for the desired optical power zone of the lens to be in front of the entrance pupil of the eye at the desired time. One problem, however with translation type bifocal contact lenses is that in the absence of external forces such as those caused by interference of eyelids, a lens placed on the eye will tend to move to a position of minimum potential energy. This process is commonly referred to as "centration". Potential energy, in the sense used in this specification is determined by a combination of gravitational forces, internal elastic forces, surface tension, pressure/suction under the lens, and lens/tear film/eye interaction. The contribution from interaction with the eyelids is excluded from the concept of potential energy.

Although translation or displacement of the lens is a three-dimensional quantity (x, y, and rotation), complicated further by distortion of the lens, for the purposes of this specification it will be treated as a one-dimensional variable (generally representing vertical displacement) except where otherwise noted.

Displacing a lens from the minimum-energy position requires the application of an external force. Displacement increases the potential energy of the lens, and so when the displacing force is removed the lens tends to return to the position of minimal energy, that is, it re-centres itself. Ideally, the lens optics are reconciled with shape so that this minimum-energy position provides the desired optical correction. Of course, with translation type bifocal contact lenses, as discussed above, the lens has two positions where it must provide the desired optical correction, one corresponding to near vision, and the other to distance vision.

In prior art lenses, in one or other of the positions, the lens is not in its minimum potential energy position. Holding the lens away from its minimum-energy position requires the presence of an externally applied force., such as interaction with the eyelid, which must be maintained for as long as the lens is to stay in this off-centre position. The application of this force can potentially cause discomfort or mechanical injury to the delicate structures of the eye.

Furthermore, any variation in the position of the eyelid is likely to change the force acting on the lens, and hence alter its position on the eye, potentially interfering with optical performance.

SUMMARY OF THE INVENTION

According to the invention there is provided a contact lens having near vision and distance vision portions, said lens being movable on the eye between first and second positions, said positions corresponding with aligning the wearer's vision through said near vision and distance vision portions respectively, said lens being positionally stable on the eye in each of said positions, and requiring a force to be applied to said lens to move between said first and second positions.

Further there is provided for said lens to have a back surface and a front surface, and for said back surface to have one or two major back curve zones occupying a major portion of the lens back surface. Said major portion/s may collectively comprise at least 50% of the back surface. Optionally the peripheral edge of the lens does not form part of said major back curve zones.

Optionally the back surface is defined by major and minor concave surfaces, and may also incorporate blending zones to reconcile these surfaces. The shape of the back surface preferably conforms to a continuous second derivative. More preferably, the shape of back surface conforms to an infinitely continuously differentiable function. Optionally the peripheral edge of the back surface of the lens does not form part of said major and minor surfaces.

An alternative is for at least the central part of the back surface of the lens to comprise a concave surface or combination of two such surfaces, that is, any two points on the one such surface may be connected by a straight line that does not pass through the interior of the lens between those points. Optionally the concave surfaces will cover the entire back surface of the lens, however, the peripheral edge thereof need not form part of said concave surfaces. These surfaces may be combined with a narrow blending zone (possibly not in itself concave) to achieve continuity at their juncture.

Said lens may be positionally more stable in one position rather than the other, thus requiring a greater force to move from the more stable position to the less stable position than visa versa.

The lens may be soft, and change in cross sectional shape in moving between said first and second positions. A partial inversion of the lens may occur during said change in cross sectional shape. Except where otherwise noted, discussion of the lens 'shape' here refers to the 'resting shape', i.e. the configuration that minimises internal stresses.

BRIEF DESCRIPTION OF THE DRAWINGS

FIG. 6 shows a 'composite eye' shape (cross-section) used in the construction of a possible bistable lens design, representing a superposition of two different orientations of the eye relative to the lens.

FIG. 7 shows an eye in three different orientations (relative to lens): forwards (7a), rotated upwards (7b), and rotated downwards (7c).

DETAILED DESCRIPTION OF THE EMBODIMENTS

Figure 1:
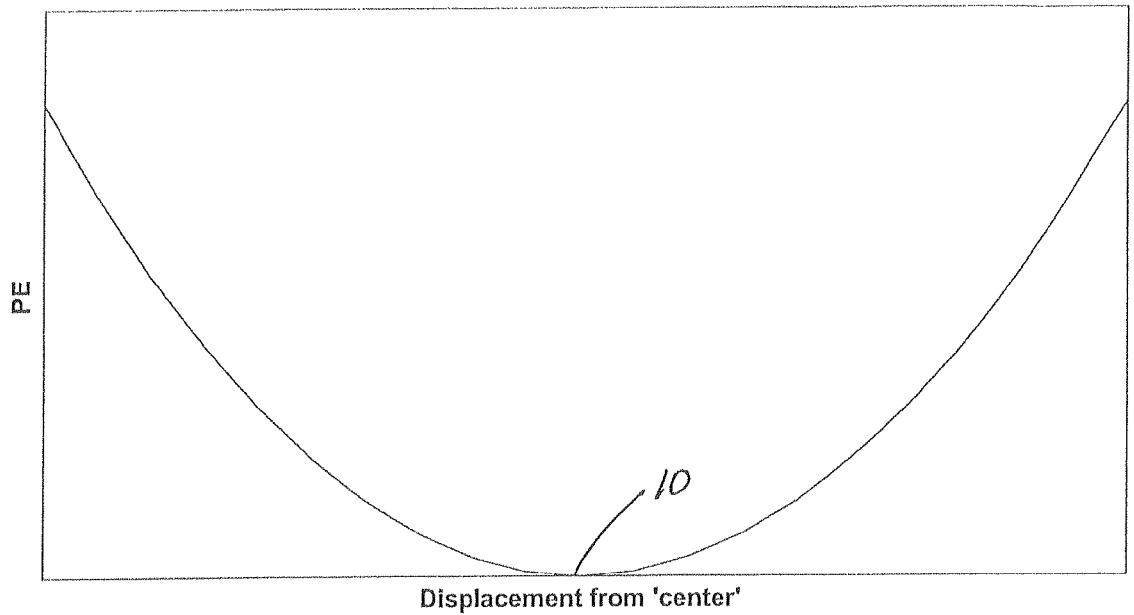
FIG. 1 shows a graph plot of potential energy against displacement for a prior art contact lens (not to scale)

Referring initially to FIG. 1, it will be noted that the central position of the lens on the eye, indicated at numeral 10 on the graph, is the minimum potential energy position. Movement of the lens away from that position, in either direction, will increase the potential energy of the lens, and accordingly some form of external force will be required to hold the lens in the higher potential energy position.

Figure 2:
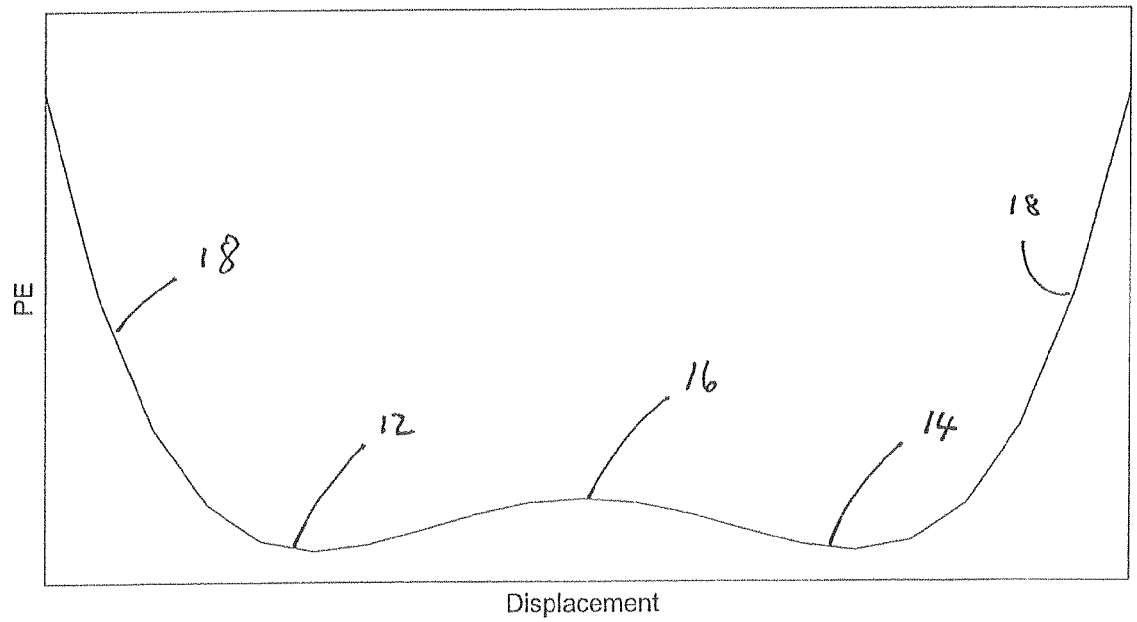
FIG. 2 shows a similar plot of a contact lens according to the invention (not to scale)

FIG. 2, on the other hand, depicts two low potential energy points on the graph, indicated at numerals 12 and 14. These two low energy points will, in accordance with the invention, correspond with the position of the lens on the eye which corresponds with optimal positions of the contact lens for near-viewing and distance-viewing. Optionally, one of those positions is at a lower potential energy than the other position, so that the lowest potential energy position becomes more stable, making it harder to inadvertently leave this position. For safety reasons it is important that the lens does not inadvertently move from the distance-viewing position to the near-viewing position. In many situations, such as driving a vehicle, inadvertent movement of the lens from the distance viewing position to the near-viewing position could potentially cause a risk situation; making the distance viewing position harder to dislodge reduces the risk of this occurrence.

Between the near and distance-viewing positions is a position of slightly higher energy, which might conveniently be referred to as a "detent" position, indicated at numeral 16. The force used to translate the lens from the near to the distance-viewing position, and visa versa, will need to be sufficient to push the lens over the detent position 16, whereafter the lens should slide under the influence of its potential energy, into the other low energy position. It will be noted that the transition between the two low energy positions is relatively flat and smooth, ensuring that no mechanical damage to the surface of the eye will occur during translation. The energy curve outside of the two low energy positions is relatively steep, as indicated at 18, ensuring the only translation of the lens that will occur is between the two low energy positions.

Figure 3:
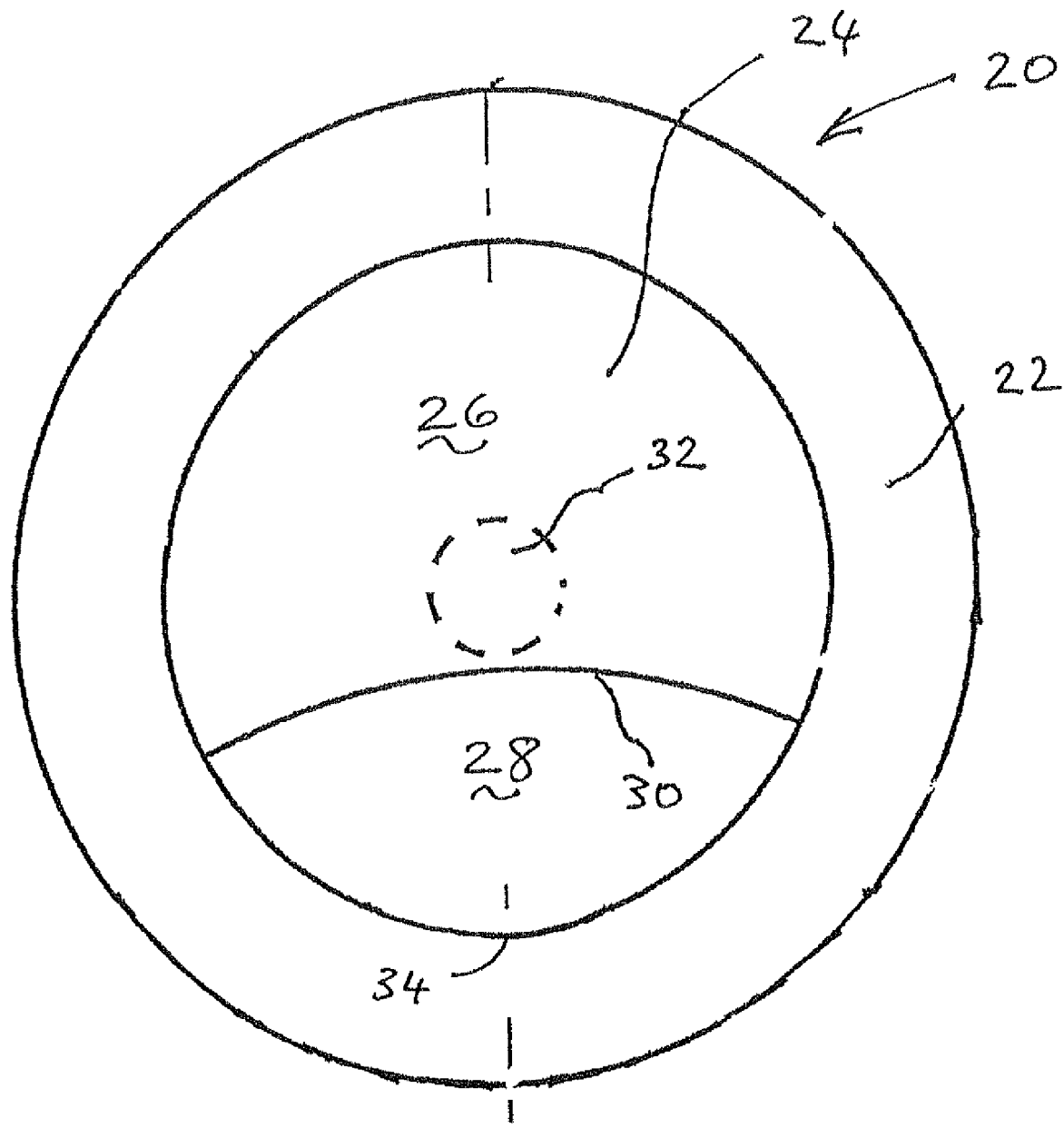
FIG. 3 shows a front view of a bifocal contact lens of the type having different zones for near and distance viewing, and which requires translation of the lens in order for the respective zones to be positioned in front of the entrance pupil of the eye.

A typical soft bifocal lens 20 according to the invention is depicted in FIG. 3 of the drawings. As shown the lens includes a peripheral region 22, and a central region 24. The central region is divided into two zones, a distance-viewing zone 26 and a near-viewing zone 28, located below the distance-viewing zone. The two zones are separated by a junction 30. An entrance pupil of the eye, indicated by dotted line 32 is typically aligned with the distance-viewing portion of the lens, and is centred with respect to the geometric centre of the lens 20. The lens 20 has a ledge or prism 34 against which the upper edge of the lower lid engages to translate the lens.

Another type of lens, not shown, may be similar to that described in U.S. Pat. No. 6,109,749 which discloses an integrally formed bevel against which the lower lid engages to translate the lens. Other types of translation mechanisms are described below. In other words, the mechanism to effect translation of the lens between its near and distance-viewing positions may be of the type shown in this patent specification, or in one of the other specifications referred to in the background section of this specification.

Figure 4:
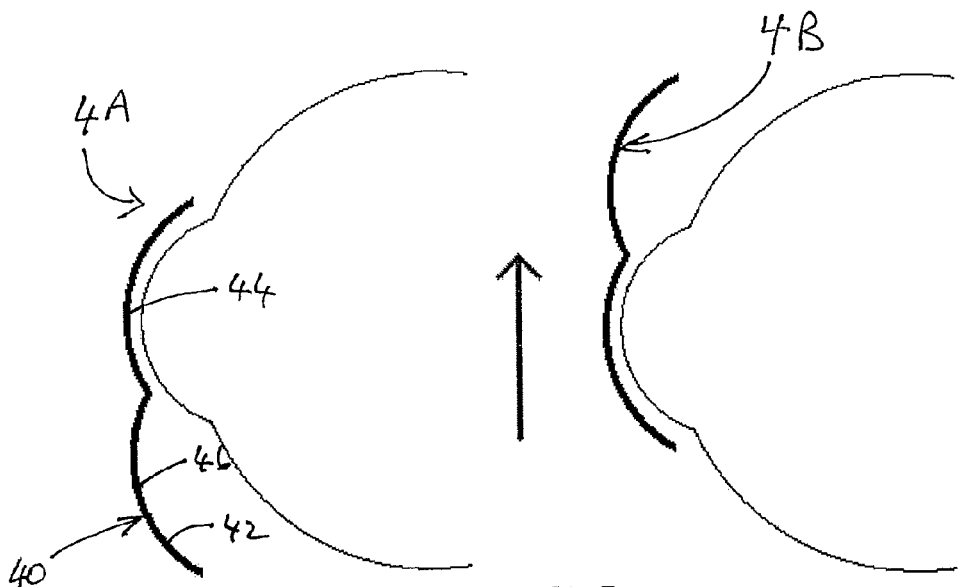
FIG. 4 shows a cross-sectional view through one embodiment of contact lens according to the invention (peripheral and blending zones not depicted).

As shown in FIG. 4 of the drawings, which discloses a lens 40 having an inner surface 42 with two dimples or convex recesses 44 and 46 therein, each of which corresponds to a position of minimum energy. By translating the lens upwardly from the position indicated in FIG. 4A to the position indicated in FIG. 4B the lens will move from the distance-viewing position to the near-viewing position. It will be appreciated that great care must be taken with the inner shape of the lens between the two stable positions in order to avoid mechanical injury to the eye when transiting between the two positions; this might be achieved e.g. by interposing a blending zone (not depicted) to smooth the junction. As mentioned previously, it is also important to avoid inadvertent transition from the distance viewing position to the near-viewing position which could be dangerous in driving and other situations where accurate distance-viewing is important. This could be achieved by making the distance viewing position a lower energy position than the near-viewing position. Such a lens may also have a peripheral zone (not depicted) to improve overall compatibility with eye shape.

Figure 5:
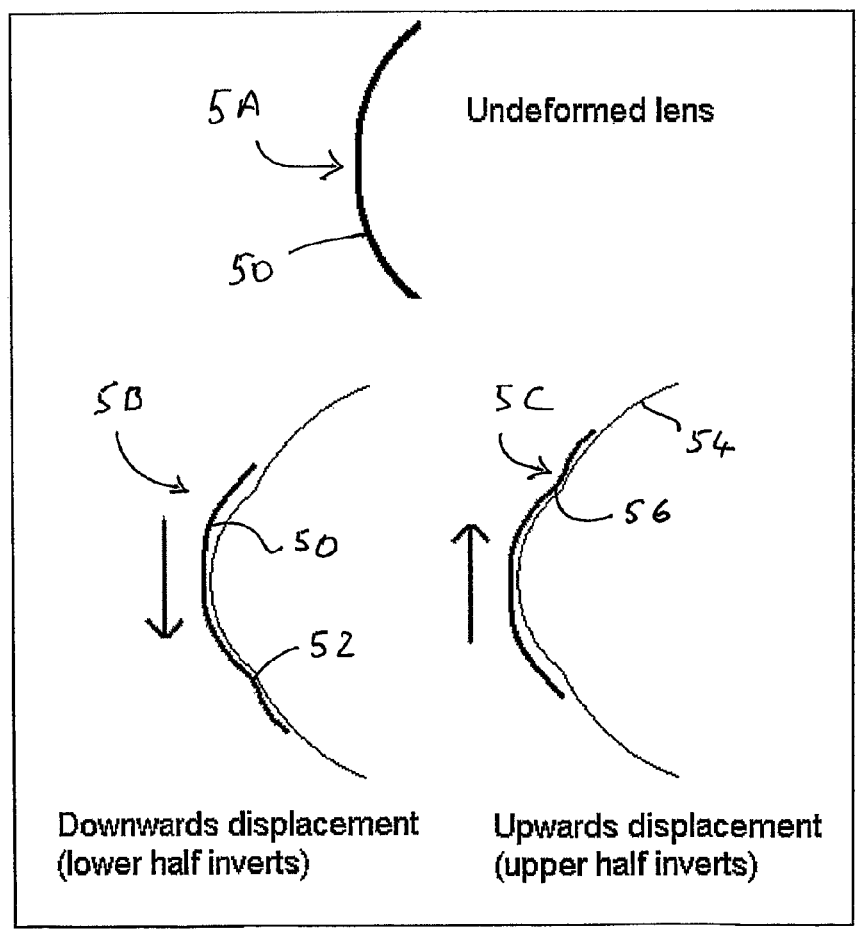
FIG. 5 shows a cross-sectional view through a second embodiment of contact lens according to the invention.

A different mechanism for achieving the bi-stable contact lens arrangement is depicted in FIG. 5 of the drawings. FIG. 5A depicts a lens 50 of undeformed shape prior to being placed on the eye of the wearer. Excluding a peripheral zone (not depicted) the back of the lens here forms a single concave surface, although the same mechanism might be used with other back surface shapes. The lens 50 is deformable by inversion of either the lower part of the concave portion of the lens, or the upper part of the lens may invert, as indicated in FIGS. 5B and 5C respectively. It will be noted that in the FIG. 5B illustration the lower part 52 of the lens has inverted in the region of the upper limbus of the eye 54, whereas in the FIG. 5C illustration, the upper part 56 of the lens has inverted, to nest into the lower limbus of the eye. Clearly the FIG. 5B illustration depicts the position of the lens for distance-viewing, whereas FIG. 5C depicts the position of the lens for near-viewing.

It will be appreciated that the present invention obviates the need for an eyelid, or other mechanism within the eye to be used to maintain the lens in position, in either the near-viewing position, or the distance-viewing position. It is envisaged that this will to a significant extent reduce the discomfort and adverse reaction to the lens associated with constantly holding the lens in a non-minimum energy position. The current approach to holding the lens in one of those positions, that is providing a ledge or cropping the lens to achieve the necessary interaction will be avoided, thereby minimising discomfort, and also assisting in the manufacturing of the lens. Since the present invention only requires a transient force to translate the lens, the ledges, bevel, or other formation can be of smaller overall dimension, or possibly eliminate all together.

Another use of the lens might be for purposes other than bifocal vision correction. For instance, a lens with a tinted upper half and a clear lower half would allow the wearer to block out bright sunlight outside, then switch to the clear section of the lens for inside use.

As has previously been mentioned, the back surface of the contact lens, that is the surface in contact with the sensitive tissues of the eye, must be constructed so as to cause minimum mechanical damage or irritation to the eye.

Examples of lens shape and other features include the following:
1. The back surface might be entirely concave, that is, any two points on the back surface may be connected by a straight line that does not pass through the interior of the lens between those two points.
2. The back surface might be formed of multiple regions, each individually concave.
3. The back surface might be similar to 2 above, but incorporating nonconcave blending regions between the concave zones.
4. The back surface might be similar to 1, 2, or 3 above, excluding the peripheral portion of the lens.
5. The back surface might have an infinitely continuously differentiable shape. Such a shape would be defined by a single mathematical function. Such a surface would typically be smooth, to allow for non-damaging translation.
6. The back surface might be similar to 5 above, excluding the peripheral portion of the lens.
7. The back surface might have a shape defined by a continuous second derivative, rather than being infinitely continuously differentiable.
8. The back surface might be similar to 7 above, excluding the peripheral portion of the lens.
9. The back surface might be entirely concave in its resting shape, as in 1 or 4 above, but the lens itself might be deformable in different positions on the eye.
10. The back surface may be shaped so that that it matches the eye shape better in its intended stable positions than it does in intermediate positions.
11. The back surface may be shaped to fit a 'composite eye' shape representing a combination of two or more different positions of the eye relative to the lens (FIG. 6), thus providing good fit on the eye in these positions.
12. The back surface may be shaped generally as in 10 or 11 above, but with blending used to smooth regions of the lens that would otherwise experience an abrupt change in curvature.
13. The back surface may be shaped as in 10, 11, or 12 above, with the different orientations generated by rotating the eye shape vertically around the centre of curvature of the sclera (thus allowing the same scleral curve to be used in both positions, if the sclera is approximately spherical).
14. The back surface may be shaped as in 13 above, with the difference in rotation between the different eye orientations matching the desired lens translation distance (as determined by ocular and other characteristics).
15. The back surface may be shaped as in any of the above, with the lens stabilised against rotation around the central axis of the eye (e.g. by means of prism ballast or other methods).

16. The lens may be generated thus:

First, define four precursor shapes:

Shape 1: An approximated eye shape composed of a spherical sclera and ellipsoid cornea, with cornea oriented forwards. Most preferred version uses the eye shape defined by setting corneal central radius to equal 7.8 mm, corneal P-value 0.75 (a parameter defined in [Guillon, M., Lydon, D. P. M., and Wilson, C. (1985) Corneal topography: a clinical model. Ophthalmol. Physiol. Opt., 6, 47-56]), corneal diameter 12.5 mm and scleral radius of curvature 12.0 mm; alternately, these parameters may be determined by reference to individual patient's eye shape. (FIG. 7a.)

Shape 2: As shape 1, but rotated around the center of the scleral sphere to raise the apex of the cornea by distance T/2, where T is the desired translation distance for the lens. (Most preferred value for T is 3.7 mm; alternately, T may be determined by reference to individual patient's eye geometry and other clinical factors.) (FIG. 7b.)

Shape 3: As shape 1, but rotated around the center of the scleral sphere to lower the apex of the cornea by distance T/2. (FIG. 7c.)

Figure 8:
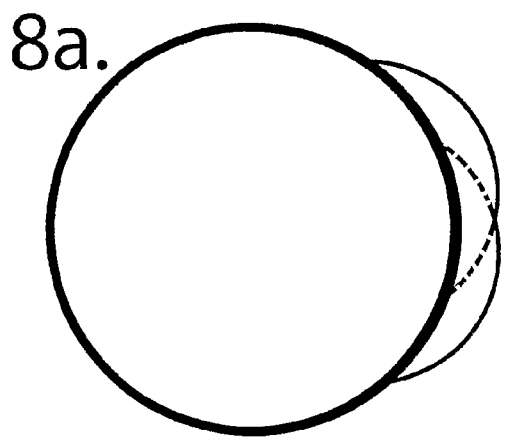
FIG. 8 shows two possibilities for the superposition of two eye shape orientations: one in which the corneas overlap and are truncated (8a) and one in which they do not (8b).
Figure 8:
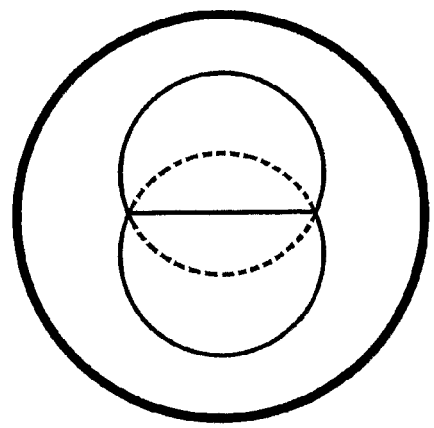
Figure 8:
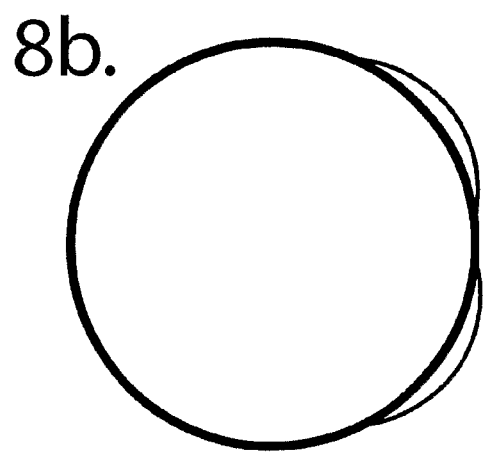
Figure 8:
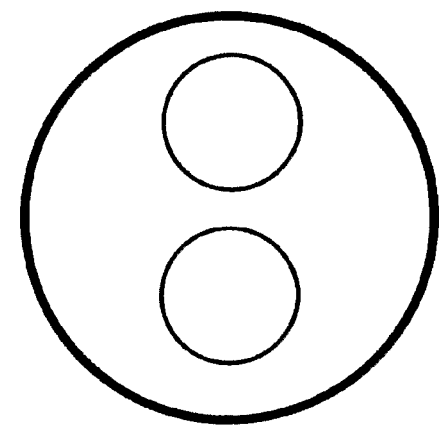

Shape 4: The superposition of shapes 2 and 3, resembling an eye with two corneas. Depending on the size of the cornea and distance T, these two corneal zones may meet (in which case they will be truncated accordingly (FIG. 8a)), or be separate (FIG. 8b).

Three zones are then defined on shape 4:

Zone 1: The region corresponding to the 'upwards' corneal region (truncated at its intersection with the 'downwards' region, if they meet).

Zone 2: The region corresponding to the 'downwards' corneal region (truncated at its intersection with the 'upwards' region, if they meet).

Zone 3: The sclera outside zones 1 and 2.

The lens perimeter is then chosen, wide enough that it lies on zone 3, entirely surrounding zones 1 and 2. In the most favoured example, the perimeter is circular with diameter 16.7 mm, center lying on the central axis of Shape 1; noncircular and/or offset perimeter shapes might also be used.

A preliminary back surface shape is thus defined: bounded by the chosen perimeter, it matches Shape 4 within that perimeter. The result is a section of a sphere (the scleral curve) interrupted by two 'dimples' matching the shape of the cornea in upwards and downwards orientations.

Figure 9:
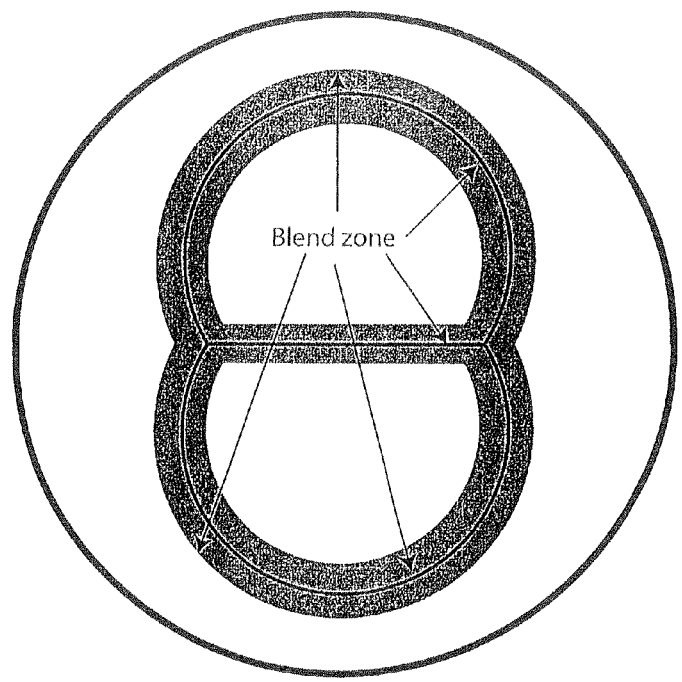
FIG. 9 shows a blending zone for a "two-dimple" lens.

A 'blending region' is identified, covering the areas where each of the zones meets each of the others. In the preferred form, this zone covers all points within 0.25 mm of these borders; other values may also be used as appropriate to the overall lens size and abruptness of junctions. (FIG. 9.)

The preliminary back surface shape is then modified on the blending region to smooth the transition between zones 1, 2, and 3. Any method that provides a smooth transition from one zone to another may be used (e.g. spline fitting, iterative or non-iterative filter methods, et al.)

The resulting shape, with blends smoothed over, forms the back surface of the lens. It will be noted that the lens can be vertically displaced between two stable positions: in one, the lens closely matches eye shape on both zone 1 and zone 3, and in the other it closely matches eye shape on both zone 2 and zone 3.

However, in intermediate positions, it only matches eye shape on zone 3, reducing its stability.

Figure 10:
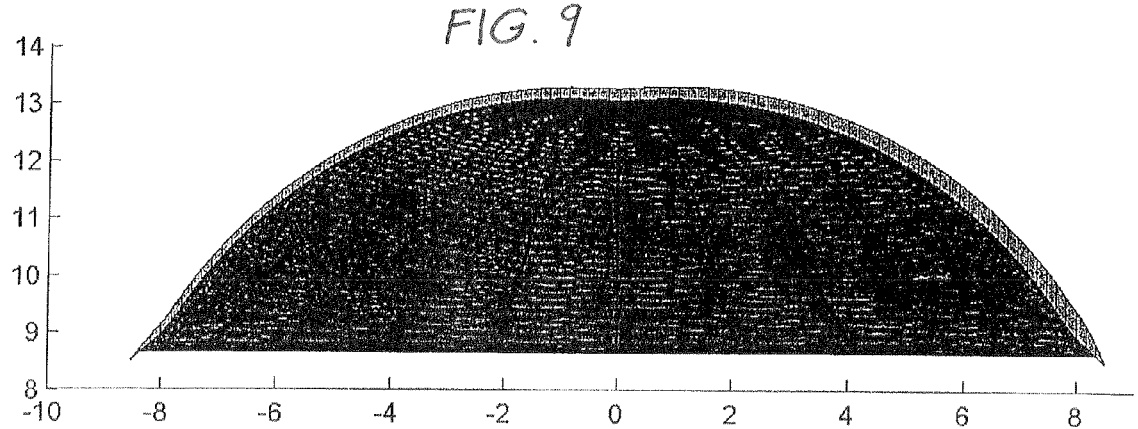
FIG. 10 shows a cut-away view of a "two-dimple" lens design.

The front surface of the lens is then formed according to optical and other requirements of the lens. Optionally, prism (increasing thickness towards the base) may be used to provide rotational stability and/or assist in causing transition between lens positions. Optionally, the edge of the lens may then be tapered. In prototypes, the lens was set either at a constant thickness of 0.100 mm, or at a steadily increasing thickness ranging from 0.100 mm at the top of the lens to 0.300 mm at the bottom (most preferred); these prototypes included a 0.5 mm wide taper zone at the periphery, in which the thickness tapered smoothly to reach 0.080 mm at the edge of the lens. (FIG. 10)

Figure 11:
FIG. 11 shows a cross-section of a composite lens design with the back surface straightened in some regions to form a single concave surface.

17. The lens may be shaped similarly to any of 11-16 above, but with the back surface 'straightened' to form a single concave surface. (FIG. 11)

18. The lens may be shaped so regions of the lens invert as part of the transition from one stable point to another, allowing good fit in either such position but not in between. (FIG. 5.)

19. The lens may be manufactured in such a way that regional variations in stiffness produce or assist in producing multiple stable points (possibly in combination with shape effects).

20. 19 above may be achieved by regionally varying lens thickness.

21. 19 above may be achieved by regionally varying lens material composition.

22. 19 above may be achieved by regionally varying treatments applied to the lens (e.g. heat, chemical, or photochemical treatment).

23. Shape effects may be augmented by prestressing the lens material (e.g. by heat, chemical, or photochemical treatment).

24. Shape effects may be augmented by surface-tension effects related to the fit of lens edge to eye shape.

Once the shape of the lens has been defined using the techniques discussed above, the manufacture of lenses will be done using typical lens manufacturing techniques. Such techniques are known in the art and need not be described herein in any great detail. Contact lenses can be manufactured from a wide range of materials (e.g. hydrogels, silicone hydrogels) and subjected to a wide variety of surface treatments (e.g. plasma coating, antimicrobial coatings); the choice of material and surface treatment is in large part dictated by considerations of biocompatibility and other issues not directly connected to the dynamic behaviour of the lens. Because choice of material affects the refractive index of the lens, the intended material will be taken into account when designing a lens shape and the final shape should satisfy both the property of bistability and desired optical characteristics. One approach to achieving this outcome is to start by determining a back surface shape conducive to desired dynamic behaviour (here including bistability) and then use iterative or other methods to calculate a front surface shape which, when paired with the predetermined back surface, will provide the desired optical corrections. In so doing, it may be necessary to take into account the fact that the lens will deform from its 'resting shape' when placed on the eye.

Once the back and front surfaces are determined, along with the central thickness, the physical lens may be manufactured. This would typically be done by calculating a large number of points on each surface, thus providing close approximations of these surfaces, and providing this data to a computer-driven manufacturing tool (e.g. a lathe). This data may then be used to cut a master (commonly made of high grade steel) in the shape of the desired lens, which is then used to make a mould in which lenses may be formed; or the data may be used to cut the front and back halves of such a mould; or the data may be used to cut the lens itself. Alternately, computer-driven deposition techniques could be used to create a master, a mould, or the lens itself. Many contact lenses are made of dehydrated materials which are then hydrated before use, and hydration commonly results in significant expansion of the lens material; thus, it may be necessary for the lens shape data to be adjusted to take this expansion into account so the final product will be of the desired dimensions. It may also be necessary to polish the master, mould, and/or lens. Other techniques may be required to achieve certain lens shapes such as milling, grinding, cutting and the like.

It will be appreciated that for a wearer to obtain the advantages of a bifocal lens of the type described herein it will be necessary for the lens to be able to translate between its two stable positions. 'Translation' refers to movement of the lens relative to the eye. This translation may be horizontal or vertical; however, the concepts discussed here may also be applied to rotation of the lens about the central axis. The exact manner of translation will, of course, depend on the structure of the lens, particularly the form of the back surface. Translation mechanisms, such as providing an integral ledge or bevel which the lid will contact as the eye moves, can be used to achieve the necessary translation.

In normal contact lens wear, a certain amount of translation is commonplace, caused by such events as blinking and movement of the eye. A moderate degree of translation during blinks is considered desirable, because it helps remove cellular debris from under the lens, but excessive translation or failure to swiftly re-center after blinking is undesirable as it may cause discomfort or interfere with optical performance of the lens.

The type of bifocal lenses discussed herein rely on deliberately-achieved translation that shifts the lens between two viewing positions (typically 'near' and 'distance') with associated optical zones on the lens. This might be achieved by applying a force to the lens—for instance, when the wearer looks down the bottom edge of the lens will contact the lower eyelid, potentially displacing the lens, or the wearer might manipulate the lens by other methods (e.g. by hand). All lenses will translate when such forces are applied; the object of bistability is to maintain certain translations when those forces are removed, as opposed to a conventional lens design which will return to a single 'centered' position in the absence of externally-applied forces.

The term "bistable" or "bistability" as used herein is intended to refer to a lens with the property of being stable in two positions on the eye.

The invention described herein has been described specifically in relation to bifocal lenses. However it is to be understood that the concepts disclosed could be equally well applied to multifocal lenses, or other types of translating lenses.

It will be understood that the invention disclosed and defined herein extends to all alternative combinations of two or more of the individual features mentioned or evident from the text or drawings. All of these different combinations constitute various alternative aspects of the invention.

The foregoing describes embodiments of the present invention and modifications, obvious to those skilled in the art can be made thereto, without departing from the scope of the present invention.

The invention claimed is:

1. A contact lens having near vision and distance vision portions, said lens being movable on the eye between first and second positions; said positions corresponding with aligning the wearer's vision through said near vision and distance vision portions respectively, said lens being positionally stable on the eye in each of said positions, and requiring a force to be applied to said lens to move between first and second positions; wherein said lens has a back surface and a front surface, and said back surface has either one or two major back curve zones occupying a major portion of the lens back surface; wherein the lens is adapted to change in cross sectional shape in moving between said first and second positions.

2. A contact lens according to claim 1 wherein said major portions comprises at least 50% of the back surface.

3. A contact lens according to claim 2 wherein the peripheral edge of the lens does not form part of said major back curve zones.

4. A contact lens according to claim 1 wherein the back surface is defined by major and minor concave surfaces.

5. A contact lens according to claim 4 wherein the back surface incorporates blending zones to reconcile these concave surfaces.

6. A contact lens according to claim 1 wherein the shape of the back surface conforms to a continuous second derivative.

7. A contact lens according to claim 6 wherein the shape of the back surface conforms to an infinitely continuously differentiable function.

8. A contact lens according to claim 1 wherein at least a central part of the back surface of the lens comprises a combination of two concave surfaces, and two points on the concave surfaces may be connected by a straight line that does not pass through the interior of the lens between such points.

9. A contact lens according to claim 8 wherein the concave surfaces will cover the entire back surface of the lens excluding the peripheral edge thereof.

10. A contact lens according to claim 4 wherein said major and minor concave surfaces are combined with a narrow blending zone to achieve continuity at their juncture.

11. A contact lens according to claim 1 wherein said lens is positionally more stable in one position rather than the other, thus requiring a greater force to move from the one more stable position to the less stable position than visa versa.

12. A contact lens according to claim 1 wherein a partial inversion of the lens occurs during said change in cross sectional shape.

* * * * *